US010764725B1

(12) United States Patent
Lim et al.

(10) Patent No.: US 10,764,725 B1
(45) Date of Patent: Sep. 1, 2020

(54) OVERRIDE OF AD HOC TALKGROUP AUTO-DROPPING

(71) Applicant: MOTOROLA SOLUTIONS, INC., Chicago, IL (US)

(72) Inventors: Bing Qin Lim, Penang (MY); Chung Yong Chong, Penang (MY); Boon Yoong Liong, Penang (MY); Anoop Sehgal A/L Paras Ram, Perak (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 16/678,434

(22) Filed: Nov. 8, 2019

(51) Int. Cl.
*H04W 4/08* (2009.01)
*H04W 84/18* (2009.01)
*H04W 84/08* (2009.01)
*H04W 4/10* (2009.01)

(52) U.S. Cl.
CPC .............. *H04W 4/08* (2013.01); *H04W 4/10* (2013.01); *H04W 84/08* (2013.01); *H04W 84/18* (2013.01)

(58) Field of Classification Search
CPC ........ H04W 4/10; H04W 84/08; H04W 84/18
See application file for complete search history.

(56) References Cited

U.S. PATENT DOCUMENTS

| 5,613,209 | A | 3/1997 | Peterson et al. |
| 7,062,286 | B2 | 6/2006 | Grivas et al. |
| 8,189,460 | B2 * | 5/2012 | Shaffer ................... H04L 47/10 370/229 |
| 8,195,215 | B2 | 6/2012 | Marocchi et al. |
| 9,167,381 | B2 | 10/2015 | McDonald et al. |
| 9,686,665 | B2 * | 6/2017 | Igumnov ............... H04W 4/029 |
| 2013/0156175 | A1 * | 6/2013 | Bekiares ................. H04W 4/10 379/202.01 |
| 2014/0243034 | A1 * | 8/2014 | Gurney ................... H04W 4/08 455/519 |
| 2016/0157134 | A1 * | 6/2016 | Kordianowski ........ H04W 4/08 455/518 |
| 2017/0265045 | A1 * | 9/2017 | Igumnov ................. H04W 4/90 |
| 2018/0376294 | A1 | 12/2018 | Tian et al. |

(Continued)

FOREIGN PATENT DOCUMENTS

EP 1920615 B1 12/2013

*Primary Examiner* — Md K Talukder
(74) *Attorney, Agent, or Firm* — Michael Best & Friedrich LLP (57) ABSTRACT

Systems and methods for overriding ad hoc talkgroup auto-dropping. One example method includes determining whether a contextual condition for a portable communications device meets a talkgroup formation criterion associated with an ad hoc talkgroup, and, in response to determining that the contextual condition meets the talkgroup formation criterion, sending a talkgroup identifier identifying the ad hoc talkgroup to the device. The method includes receiving a contextual condition update for the device and determining whether the update meets the talkgroup formation criterion. The method includes, in response to determining that the update does not meet the talkgroup formation criterion, sending an audio mute command based on the talkgroup identifier and a notification requesting an override action to the device. The method includes, when an override action indication is received from the device during a standby period, sending an audio unmute command based on the talkgroup identifier to the device.

20 Claims, 6 Drawing Sheets

(56) References Cited

U.S. PATENT DOCUMENTS

| | | | |
|---|---|---|---|
| 2019/0149959 A1* | 5/2019 | Kee | H04W 4/10 |
| | | | 704/258 |
| 2019/0334709 A1* | 10/2019 | Paterour | H04L 9/0833 |
| 2019/0349426 A1* | 11/2019 | Smith | H04L 67/104 |
| 2020/0120458 A1* | 4/2020 | Aldana | H04W 28/22 |

* cited by examiner

OVERRIDE OF AD HOC TALKGROUP AUTO-DROPPING

BACKGROUND OF THE INVENTION

Public safety and other organizations use portable communications devices (for example, land mobile radios) to facilitate communication between their members. To streamline communication, organization members may be assigned to different communication groups (sometimes referred to as "talkgroups"). For example, to send a communication to a group of members, a member sends a single communication to an assigned talkgroup rather than sending a communication to individual members. An organization may have several talkgroups, and some talkgroups may include members spanning multiple organizations. Some talkgroups are pre-defined and programmed into the portable communications devices of the organization members. Other talkgroups, known as "ad hoc talkgroups," are formed dynamically (for example, as part of an incident response). Individual members are automatically added to ad hoc talkgroups when they meet criteria for the ad hoc talkgroup. When a member no longer meets the criteria, the member is automatically dropped from the ad hoc talkgroup.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Within land mobile radio and other wireless networks, talkgroups are used to organize and streamline communications. Talkgroups provide virtual radio channels in digital radio systems for use by subsets of users of a communications network. Members of a talkgroup are able to communicate with one another using push-to-talk (PTT) communications. Talkgroup communications are kept within the talkgroup and are not transmitted to others using the same communications network who are not members of the talkgroup. In some communications systems, to facilitate, among other things, incident response, ad hoc talkgroups are formed dynamically by network infrastructure (for example, call controllers).

Members are added to ad hoc talkgroups when they meet the criteria for joining or being added automatically to the talkgroup. Current systems and methods for administering ad hoc talkgroups automatically drop members from the group when they no longer meet the criteria. For example, a report of a traffic accident at a particular location may trigger the formation of an ad hoc talkgroup using an estimated time of arrival at the location as the formation criteria. First responders who meet the formation criteria (for example, an estimated time of arrival of five minutes or less) are automatically added to the talkgroup (for example, by a call controller). However, a responder heading to the location of the accident who encounters adverse traffic conditions that raise his or her estimated time of arrival above five minutes would be removed from the ad hoc talkgroup. As a consequence, first responders, who still may need to communicate to members within the talkgroup, are unable to do so.

In some cases, automatically dropping members from ad hoc talkgroups results in inefficient use of the overall communications network. For example, some ad hoc talkgroup members may begin responding to the incident or condition that gave rise to the talkgroup. If they are dropped before the response is complete, they will still need to communicate with members of the talkgroup, but must now signal those members by using other talkgroups and channels on the same communications network, or by relaying their messages through a dispatcher. This results in two channels of the network being used for the same communications that formerly required only one. Automatically dropped members may also request that a dispatcher add them back into the talkgroup. However, this wastes time, network, and computing resources. Communications may also be attempted through other communications networks (for example, by using a cellular telephone). The use of additional networks to replace formerly single-network communication also wastes time and resources. Further, manually setting up another communication channel or using other existing channel (for example, another existing talkgroup) to communicate may result in some relevant members of the ad hoc talkgroup missing out on the communications. Accordingly, systems and methods are provided herein for, among other things, overriding auto-dropping from ad hoc talkgroups.

Among other things, embodiments provided herein, rather than automatically dropping an ad hoc talkgroup member that no longer meets the talkgroup formation criteria, place the member's radio in a standby mode and alert that member to the pending auto drop. Members in standby mode are provided an opportunity to perform an override action, which, if performed, will cancel the auto drop process. Using such embodiments, first responders and other users are able to maintain their membership in the talkgroup and communicate directly with talkgroup members, instead of using other means or intermediaries to do so. In some embodiments, override actions taken by members may be used to adjust the talkgroup formation criteria to reduce the initiation of auto drops that are likely to be overridden, leading to more efficient use of the communications network.

One example embodiment provides a call controller for a communications network. The call controller includes a transceiver and an electronic processor. The electronic processor is configured to determine whether a contextual condition for a portable communications device meets a talkgroup formation criterion associated with an ad hoc talkgroup. The electronic processor is configured to, in response to determining that the contextual condition meets the talkgroup formation criterion, send a talkgroup identifier identifying the ad hoc talkgroup to the portable communications device via the transceiver. The electronic processor is configured to receive a contextual condition update for the portable communications device. The electronic processor is configured to determine whether the contextual condition update meets the talkgroup formation criterion. The electronic processor is configured to, in response to determining that the contextual condition update does not meet the talkgroup formation criterion, send an audio mute command based on the talkgroup identifier to the portable communications device via the transceiver. The electronic processor is configured to send a notification requesting an override action to the portable communications device via the transceiver. The electronic processor is configured to, when an override action indication is received from the portable communications device during a standby period, send an audio unmute command based on the talkgroup identifier to the portable communications device via the transceiver. The electronic processor is configured to, when an override action indication is not received from the portable communications device during the standby period, send a drop command based on the talkgroup identifier to the portable communications device via the transceiver.

Another example embodiment provides a method for operating a communications network. The method includes determining, with an electronic processor, whether a contextual condition for a portable communications device meets a talkgroup formation criterion associated with an ad hoc talkgroup. The method includes, in response to determining that the contextual condition meets the talkgroup formation criterion, sending a talkgroup identifier identifying the ad hoc talkgroup to the portable communications device via a transceiver. The method includes receiving a contextual condition update for the portable communications device. The method includes determining, with the electronic processor, whether the contextual condition update meets the talkgroup formation criterion. The method includes, in response to determining that the contextual condition update does not meet the talkgroup formation criterion, sending an audio mute command based on the talkgroup identifier to the portable communications device via the transceiver. The method includes sending a notification requesting an override action to the portable communications device via the transceiver. The method includes, when an override action indication is received from the portable communications device during a standby period, sending an audio unmute command based on the talkgroup identifier to the portable communications device via the transceiver, so that portable communication device will resume broadcast communication audio received from the talkgroup through the speaker.

For ease of description, some or all of the example systems presented herein are illustrated with a single exemplar of each of its component parts. Some examples may not describe or illustrate all components of the systems. Other example embodiments may include more or fewer of each of the illustrated components, may combine some components, or may include additional or alternative components.

Figure 1:
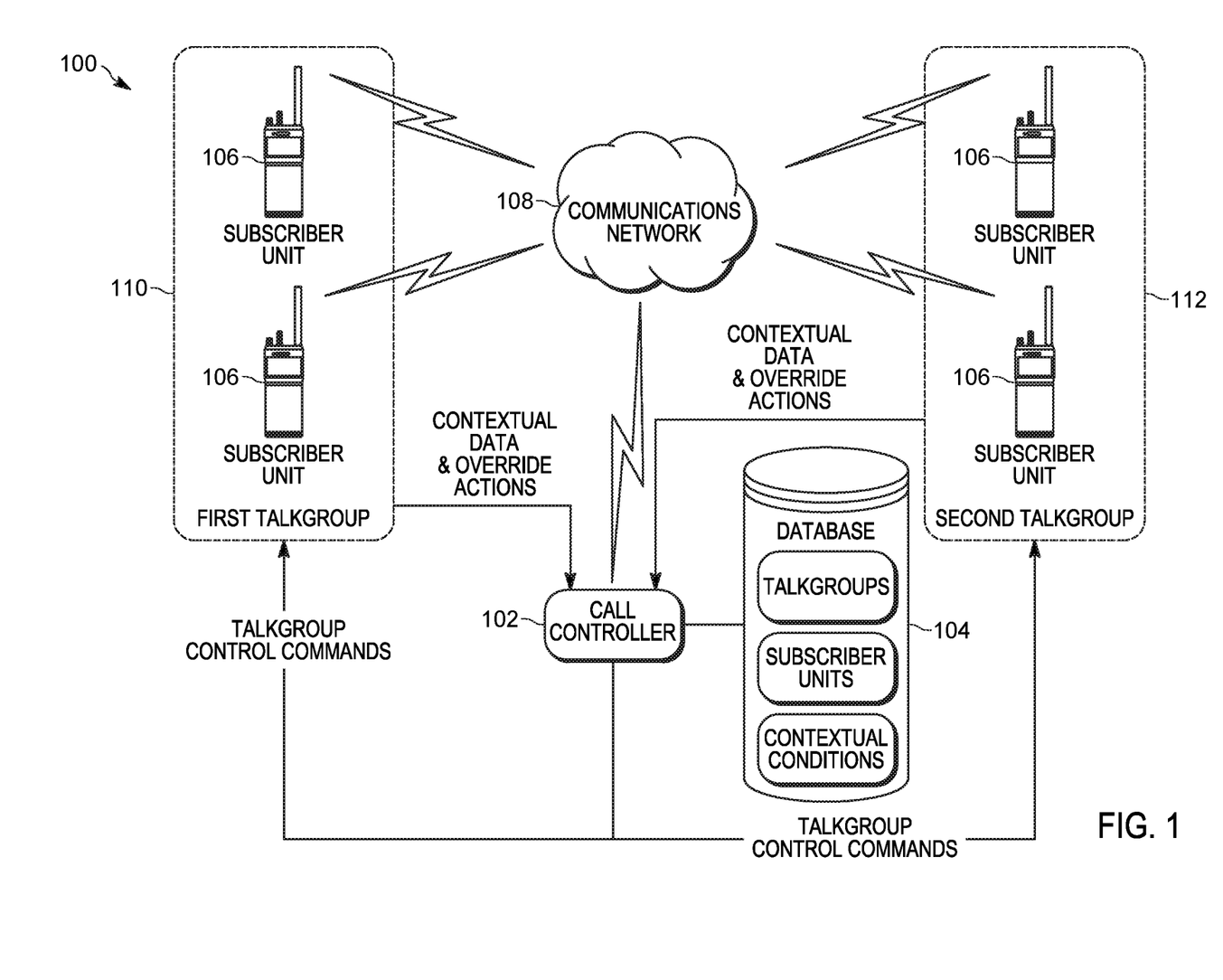
FIG. 1 is a diagram of a communications system in accordance with some embodiments.
Figure 2:
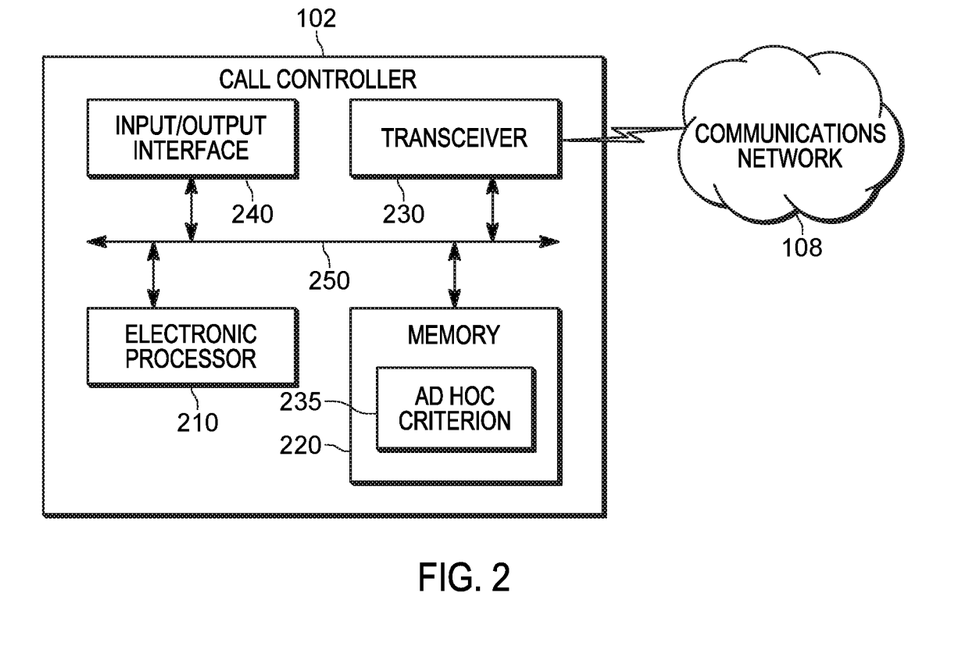
FIG. 2 is a block diagram of a call controller of the communications system of FIG. 1 in accordance with some embodiments.

FIG. 1 is a diagram of one embodiment of a communications system 100. In the example illustrated, the system 100 includes a call controller 102, a database 104, and a plurality of subscriber units 106. The call controller 102, described more particularly below with respect to FIG. 2, is communicatively coupled to, and writes data to and from, the database 104. As illustrated in FIG. 1, the database 104 may be a database housed on a suitable database server communicatively coupled to and accessible by the call controller 102. In alternative embodiments, the database 104 may be part of a cloud-based database system (for example, a data warehouse) external to the system 100 and accessible by the call controller 102 over one or more wired or wireless networks. In some embodiments, all or part of the database 104 may be locally stored on the call controller 102. In some embodiments, as described below, the database 104 electronically stores talkgroup data (for example, data designating talkgroup assignments for the subscriber units 106, data indicating under what conditions for form ad hoc talkgroups, and the like), subscriber unit data (for example, model, configuration, and user characteristic information for the subscriber units 106), and contextual condition data (for example, telemetry and other data relating to the subscriber units and users of the subscriber units transmitted by the subscriber units 106 to the call controller 102).

The subscriber units 106 are communicatively coupled via a communications network 108. The communications network 108 may include a land mobile radio (LMR) network, a terrestrial trunked radio (TETRA) network, or a digital mobile radio (DMR) network. The communications network 108 may also include a wide area network (WAN) (for example, a transport control protocol/internet protocol (TCP/IP) based network), a cellular network, (for example, a long-term evolution (LTE) network), a device-to-device network, and combinations or derivatives thereof.

In the embodiment illustrated, the communications network 108 operates in a trunked configuration. The communications network 108 and its subscriber units use a pool of traffic channels for a virtually unlimited number of talkgroups of subscriber units. Thus, all groups are served by all channels. A trunked radio system operates to take advantage of the probability that not all groups need a traffic channel for communication at the same time. With a given number of channels, a much greater number of groups may be accommodated in a trunked radio system as compared with a conventional radio system. As used in the present application, the term "talkgroup" refers to a virtual radio channel that is used for communication among a group of subscriber units. As noted, an organization may have several talkgroups and each talkgroup may be associated with a particular mission of the organization. A mission refers to a task or activity assigned to one or more members of an organization or a sub-division thereof. For example, a talkgroup may include a group of police officers patrolling a predefined neighborhood. Similarly, a talkgroup may include members who have the same role or designation (for example, police office, detective, paramedic, and the like) within a mission. For example, paramedics and firefighters responding to a distress call may be grouped into two different talkgroups part of the same mission. Each subscriber unit in a particular talkgroup is assigned a talkgroup identifier, which allows the subscriber unit to communicate with other subscriber units assigned the same talkgroup identifier. Subscriber units (and thus the users of the subscriber units) can be assigned to multiple talkgroups. In the example illustrated in FIG. 1, the subscriber units 106 are divided into two talkgroups, a first talkgroup 110, and a second talkgroup 112. Either one of the first talkgroup 110 and the second talkgroup 112 may be a pre-defined talkgroup or an ad hoc talkgroup.

In some embodiments, talkgroups are created and administrated by the call controller 102. The call controller 102 may be, for example, a dispatch controller for a public safety organization. The call controller 102 communicates with the plurality of subscriber units 106 via the communications network 108. On a singular basis, one of the subscriber units 106 may be referred to herein as a subscriber unit 106. Each of the subscriber units 106 is a portable communications device, and may be, for example, a mobile two-way radio, a smart telephone, a smart watch, a laptop computer, a tablet computer, or other similar device capable of operating as described herein. As described in detail herein, the call controller 102 sends talkgroup commands (for example, adding or removing subscriber units from one or more talkgroups) to the subscriber units 106. The subscriber units 106 transmit data (for example, contextual data) and commands (for example, override actions), both described in detail herein, to the call controller 102.

In certain embodiments, the call controller 102 may be a central network equipment or a dispatch controller used by a public safety agency such as a fire department or police department. In other embodiments, the call controller 102 may be any network equipment used by an agency, network administrator, or telecommunications provider.

FIG. 1 illustrates only one exemplary embodiment of the system 100. In other embodiments, the system 100 may include more or fewer components and may perform functions that are not explicitly described herein. In addition, although the call controller 102 is illustrated as communicating with the subscriber units 106 via a single communications network 108, the call controller 102 may communicate with the subscriber units 106 via multiple communication networks (constructed in accordance with various network protocols) and connections (for example, wired or wireless connections). Further, although the system 100 is shown as a centralized system, the system 100 may also be implemented as a decentralized system in which the functionality of the call controller 102 is accomplished within one or more of the subscriber units 106, or in other network infrastructure (not shown).

FIG. 2 schematically illustrates one embodiment of the call controller 102. In the example illustrated, the call controller 102 includes an electronic processor 210, a memory 220, a transceiver 230, and an input/output interface 240. The electronic processor 210, the memory 220, the transceiver 230, and the input/output interface 240 communicate over one or more control and/or data buses (for example, a communication bus 250). FIG. 2 illustrates only one exemplary embodiment of a call controller 102. The call controller 102 may include more or fewer components and may perform functions other than those explicitly described herein.

In some embodiments, the electronic processor 210 is implemented as a microprocessor with separate memory, such as the memory 220. In other embodiments, the electronic processor 210 may be implemented as a microcontroller (with memory 220 on the same chip). In other embodiments, the electronic processor 210 may be implemented using multiple processors. In addition, the electronic processor 210 may be implemented partially or entirely as, for example, a field-programmable gate array (FPGA), and application specific integrated circuit (ASIC), and the like and the memory 220 may not be needed or be modified accordingly. In the example illustrated, the memory 220 includes non-transitory, computer-readable memory that stores instructions that are received and executed by the electronic processor 210 to carry out functionality of the call controller 102 described herein. The memory 220 may include, for example, a program storage area and a data storage area. The program storage area and the data storage area may include combinations of different types of memory, such as read-only memory and random-access memory. In the embodiment illustrated, the device memory 320 stores, among other things, an ad hoc talkgroup formation criterion 235 (described in detail below).

The transceiver 230 enables wireless communication from the call controller 102 to, for example, the subscriber units 106 via the communications network 108. In other embodiments, rather than the transceiver 230, the call controller 102 may include separate transmitting and receiving components, for example, a transmitter, and a receiver. In yet other embodiments, the call controller 102 may not include a transceiver 230 and may communicate with the subscriber units 106 via a network interface and a wired connection to the communications network 108.

As noted above, the call controller 102 may include the input/output interface 240. The input/output interface 240 may include one or more input mechanisms (for example, a touch screen, a keypad, a button, a knob, and the like), one or more output mechanisms (for example, a display, a printer, a speaker, and the like), or a combination thereof. The input/output interface 240 receives input from input devices actuated by a user (for example, a dispatcher), and provides output to output devices with which the user interacts. In some embodiments, as an alternative or in addition to managing inputs and outputs through the input/output interface 240, the call controller 102 may receive user input, provide user output, or both by communicating with an external device, such as a console computer, over a wired or wireless connection.

In some embodiments, the call controller 102 performs machine learning functions, for example, to determine when and how to form ad hoc talkgroups. Machine learning generally refers to the ability of a computer program to learn without being explicitly programmed. In some embodiments, a computer program (for example, a learning engine) is configured to construct an algorithm based on inputs. Supervised learning involves presenting a computer program with example inputs and their desired outputs. The computer program is configured to learn a general rule that maps the inputs to the outputs from the training data it receives. Example machine learning engines include decision tree learning, association rule learning, artificial neural networks, classifiers, inductive logic programming, support vector machines, clustering, Bayesian networks, reinforcement learning, representation learning, similarity and metric learning, sparse dictionary learning, and genetic algorithms. Using all of these approaches, a computer program can ingest, parse, and understand data, and progressively refine algorithms for data analytics.

Figure 3:
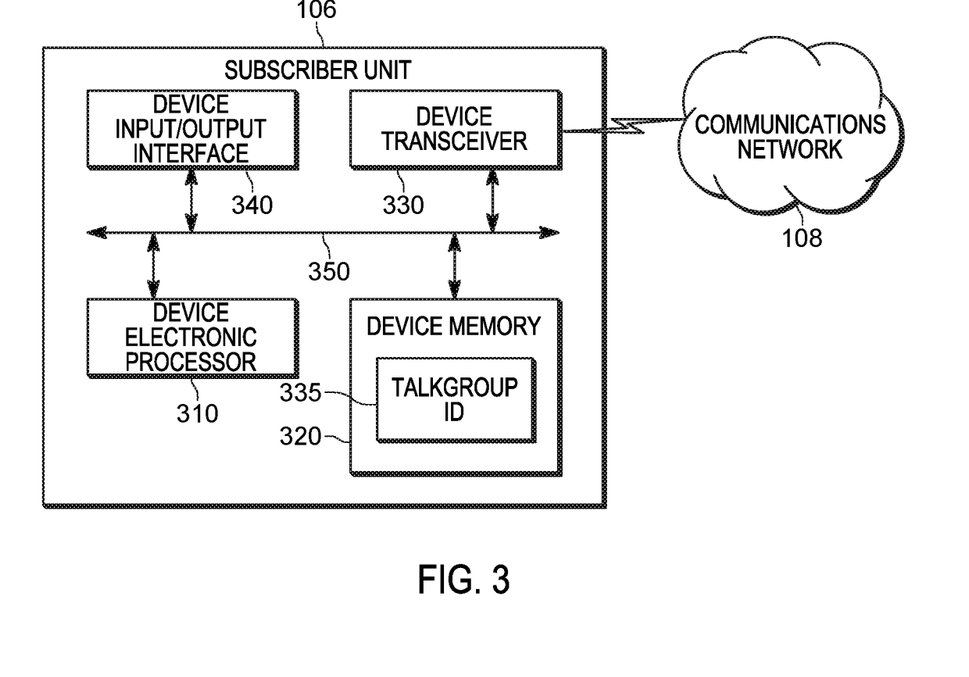
FIG. 3 is a block diagram of a portable communications of the communications system of FIG. 1 in accordance with some embodiments.

FIG. 3 schematically illustrates one embodiment of a subscriber unit 106. In the example illustrated, the subscriber unit 106 includes, among other things, a device electronic processor 310, a device memory 320, a device transceiver 330, and a device input/output interface 340. The device electronic processor 310, the device memory 320, the device transceiver 330, and the device input/output interface 340 communicate over one or more control and/or data buses (for example, a device communication bus 350). FIG. 3 illustrates only one exemplary embodiment of the subscriber unit 106. The subscriber unit 106 may include more or fewer components than illustrated and may perform additional functions other than those described herein.

The device electronic processor 310 may be implemented in various ways including ways that are similar to those described above with respect to the electronic processor 210. Likewise, the device memory 320 may be implemented in various ways including ways that are similar to those described with the respect to the memory 220. The device memory 320 may store instructions that are received and executed by the device electronic processor 310 to carry out the functionality described herein. In the embodiment illustrated, the device memory 320 stores, among other things, a talkgroup identifier 335.

The device transceiver 330 enables wireless communication from the subscriber unit 106 to, for example, the call controller 102 via the communication network 130. In other embodiments, rather than a device transceiver 330, the subscriber unit 106 may include separate transmitting and receiving components, for example, a transmitter and a receiver.

The device input/output interface 340 may include one or more input mechanisms (for example, a microphone, a touch screen, a keypad, a button, a knob, a push-to-talk (PTT) selection mechanism, and the like), one or more output mechanisms (for example, a display, a speaker, and the like), or a combination thereof.

In some embodiments, the subscriber unit 106 communicates with one or more external devices that may be part of a personal area network (PAN) of devices. The one or more external devices may include, for example, a holster sensor, an environmental sensor, a biometric sensor, a body-mountable camera, and the like.

Many such subscriber units further comprise, or provide access to, electronic digital assistants (or sometimes referenced as "virtual partners") that may provide the user thereof with valuable information in an automated (for example, without further user input) or semi-automated (for example, with some further user input) fashion. The valuable information provided to the user may be based on explicit requests for such information posed by the user via an input (for example, such as a parsed natural language input or an electronic touch interface manipulation associated with an explicit request) in which the electronic digital assistant may reactively provide such requested valuable information.

As some existing examples, electronic digital assistants such as Siri™ provided by Apple, Inc. and Google Assistant™ provided by Google LLC, are software applications running on underlying electronic hardware that are capable of understanding natural language, and may complete electronic tasks in response to user voice inputs, among other additional or alternative types of inputs. These electronic digital assistants may perform such tasks as taking and storing voice dictation for future reference and retrieval, reading a received text message or an e-mail message aloud, generating a text message or e-mail message reply, looking up requested phone numbers and initiating a phone call to a requested contact, generating calendar appointments and providing appointment reminders, warning users of nearby dangers such as traffic accidents or environmental hazards, and providing many other types of information in a reactive or proactive manner.

Figure 4:
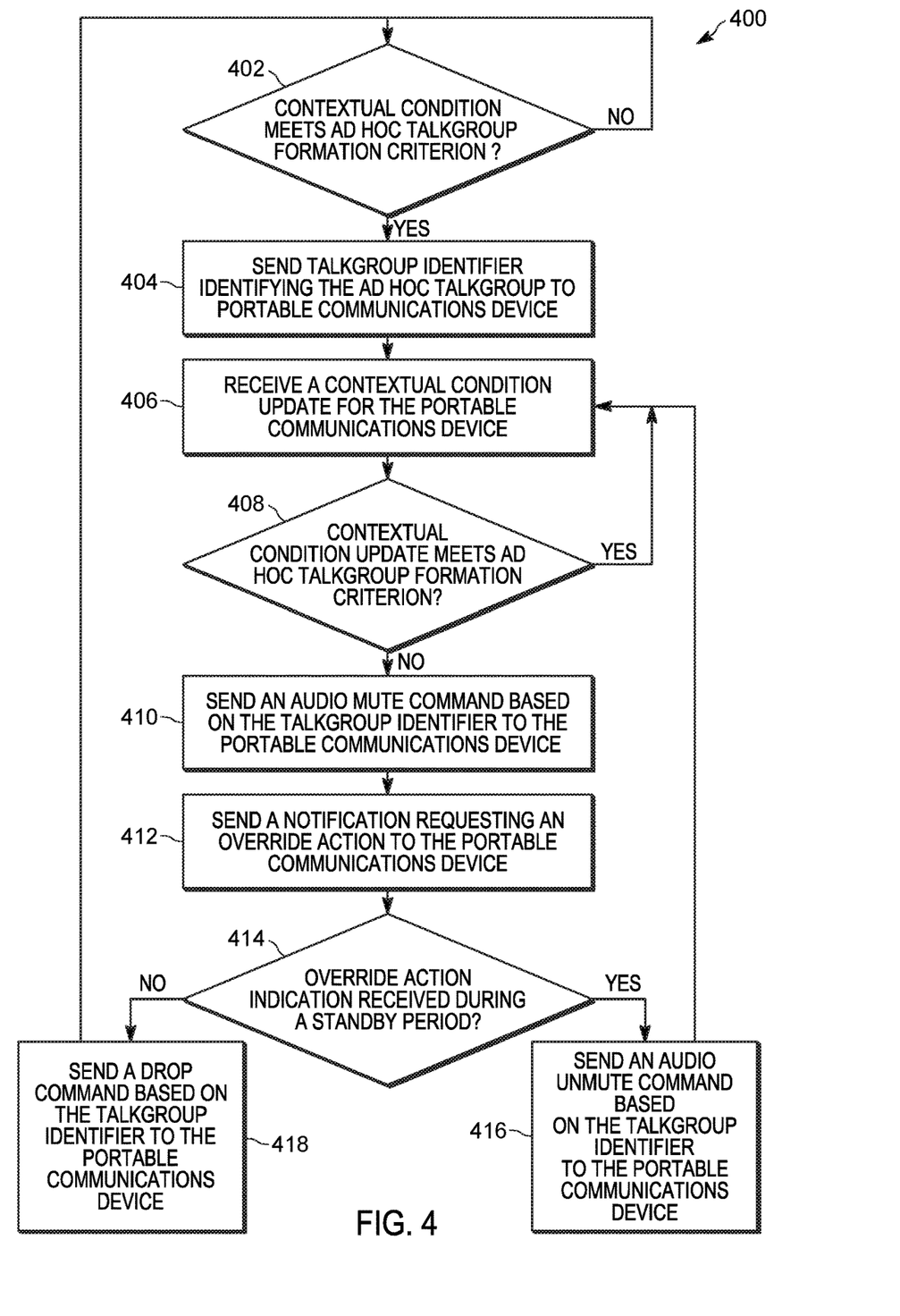
FIG. 4 is a flowchart illustrating a method for operating the communications system of FIG. 1 in accordance with some embodiments.

As noted, call controllers (for example, the call controller 102) may establish and manage ad hoc talkgroups. Subscriber units are automatically added to or dropped from ad hoc talkgroups based on whether they meet certain criteria. However, automatically dropping members from ad hoc talkgroups may interrupt communications. Auto-dropped members may still need to communicate with the remaining members of the talkgroup. This can result in inefficient use of the overall communications network as members use alternative communications means. FIG. 4 illustrates an example method 400 for operating a communications system to provide for overriding of auto-dropping from ad hoc talkgroups. Although the method 400 is described in conjunction with the system 100 as described herein, the method 400 could be used with other systems and devices. In addition, the method 400 may be modified or performed differently than the specific example provided.

As an example, the method 400 is described as being performed by the call controller 102 and, in particular, the electronic processor 210. However, it should be understood that in some embodiments, portions of the method 400 may be performed by other devices, including for example, one or more of the subscriber units 106. Additional electronic processors may also be included in the subscriber units 106 and/or call controller 102 that perform all or a portion of the method 400. For ease of description, the method 400 is described in terms of a single "portable communications device," which may be any one of the subscriber units 106. However, the method 400 may be applied to multiple portable communications devices.

Figure 5:
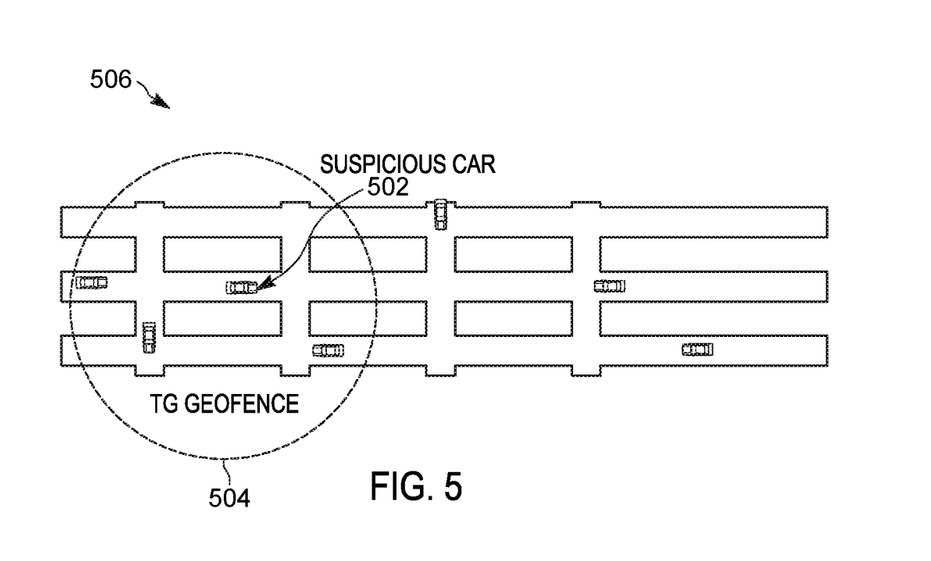
FIG. 5 is a diagram illustrating the formation of an ad hoc talkgroup using the communications system of FIG. 1 in accordance with some embodiments.

At block 402, the electronic processor 210 determines whether a contextual condition for a portable communications device meets a talkgroup formation criterion associated with an ad hoc talkgroup. As noted, ad hoc talkgroups are formed, for example, to respond to a particular incident (for example, to investigate a suspicious vehicle). A formation criterion is established for the ad hoc talkgroup. For example, as illustrated in FIG. 5, where a suspicious vehicle 502 has been reported, an ad hoc talkgroup is formed using a geofence 504 as the formation criterion. The contextual condition compared depends on the ad hoc talkgroup formation criterion. The contextual condition can be said to meet the talkgroup formation criterion when, for example, a value of the contextual condition matches a value for the talkgroup formation criterion. In the example, illustrated in FIG. 5, the formation criterion is the geofence 504. A contextual condition in this example would be a location for the portable communications device, and the contextual condition can be said to meet the talkgroup formation criterion when the location is bounded by the geofence. In another example, the contextual condition can be said to meet the talkgroup formation criterion when a value of the contextual condition exceeds, meets, or fails to meet a threshold value for the talkgroup formation criterion. For example, a talkgroup formation criterion may be an estimated time of arrival (ETA) at an incident. A contextual condition in this example would be the ETA for the portable communications device (for example, as determined using geolocation data, transport mode, traffic condition data, and the like), and the contextual condition can be said to meet the talkgroup formation criterion when the ETA is lower than a threshold ETA.

Other examples of formation criteria include an incident type (for example, a traffic accident, a fire, a crime in progress, and the like), an incident severity (indicating, for example, how large or what type of response may be needed), a travel time (for example, an estimated time of arrival for a responder), a transport mode (for example, a vehicle type, on foot, and the like), a shared transport (for example. a public safety vehicle, which multiple personnel are boarding, or an airplane, which multiple people are boarding), a characteristic of a user of the portable communications device (for example, a cognitive load for the user), a response role (for example, a skill set, an assigned task, and a job function), an activity type (for example, writing a report for the same incident, investigating the same case, working on the same warrant, performing a Virtual Partner query of a same subject or object), an observed object (for example, a stolen vehicle determined through automatic license plate recognition and video analytics, a be-on-the-lookup (BOLO) person, and a suspect determined through face recognition), a role relationship (for example, a dispatcher and an assigned first responder, a 911 caller and an assigned first responder, a team lead and team members, two dispatchers handling same case, and the like), and a resource type associated with the portable communications device (for example, a type of incident response equipment, and a media recording capability of the device).

As noted, the contextual condition compared (in block 402) depends on the ad hoc talkgroup formation criterion. In the example illustrated in FIG. 5, the contextual condition is the location of the portable communications device (for example, as reported using an electronic geolocation system). In another example, where the formation criterion is an incident type, the contextual condition may be the role of the user of the portable communications device. For example, for an ad hoc talkgroup formed using an incident type of "fire," members who are firefighters may meet the criterion for joining the talkgroup. In some embodiments, more than one criterion is used to form an ad hoc talkgroup. For example, all firefighters within a geofence surrounding the scene of a fire may meet the ad hoc talkgroup formation criteria.

In some embodiments, the contextual conditions are retrieved from a data source (for example, the database 104). In some embodiments, contextual conditions are received from sensors within a personal area network of the portable communications device. For example, a device may receive sensor data from, for example, a holster sensor, a temperature sensor, a blood pressure sensor, or the like worn by a public safety officer (for example, a talkgroup participant). This sensor information is, in turn, transmitted to the call controller 102.

Continuing with FIG. 4, in some embodiments, when the contextual condition for the portable communications device does not meet the talkgroup formation criterion, the method 400 continues receiving and comparing contextual condition data (at block 402).

When a portable communications device meets the criterion, the device is added to the talkgroup. In this example, the group of portable communications devices 506 within the geofence are added to the ad hoc talkgroup (see FIG. 5). In response to determining that the contextual condition meets the talkgroup formation criterion (at block 402), the electronic processor 210, at block 404, sends a talkgroup identifier identifying the ad hoc talkgroup to the portable communications device (for example, via the transceiver 230). When the portable communications device receives the talkgroup identifier, it may use the identifier to participate in the ad hoc talkgroup (for example, by programming itself to a certain frequency channel indicated by the talkgroup identifier).

At block 406, the electronic processor 210 receives (for example, from the portable communications device) a contextual condition update for the portable communications device. A contextual condition update is an updated value for the contextual condition compared at block 402. For example, a device's speed, direction, and location may be periodically or continuously updated. In another example, the estimated time of arrival for the portable communications device may be updated by the call controller 102 based on location information and current traffic condition data. At block 408, the electronic processor 210 determines whether the contextual condition update still meets the talkgroup formation criterion.

Figure 6:
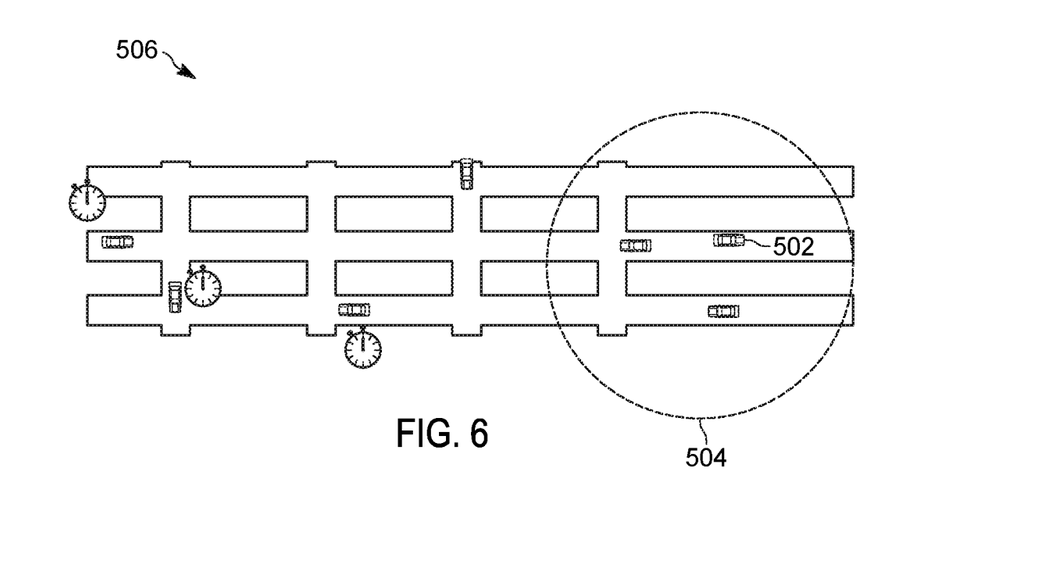
FIG. 6 is a diagram illustrating the operation of the method of FIG. 4 with the ad hoc talkgroup of FIG. 5 in accordance with some embodiments.

When the contextual condition update for a portable communications device does not meet the talkgroup formation criterion, the device is removed (dropped) from the ad hoc talkgroup. For example, as illustrated in FIG. 6, the vehicle 502 has moved, causing the geofence 504 to move along with it. As a result, the contextual condition updates (for example, GPS coordinates) for the group of portable communications devices 506 indicate that they are no longer within the geofence 504. Returning to FIG. 4, to prevent disruption in service and wasted communications resources, the call controller 102 does not immediately drop the portable communications device from the ad hoc talkgroup. Instead, to prevent disruption in service and wasted communications resources, the electronic processor 210, in response to determining that the contextual condition update does not meet the talkgroup formation criterion (at block 408), sends an audio mute command based on the talkgroup identifier to the portable communications device via the transceiver (at block 410), so that the portable communications device will not broadcast the communication audio when receiving communication from the talkgroup. The audio mute command, when received by the portable communications device, causes it to stop playing audio from the ad hoc talkgroup (for example, over a loudspeaker) for the user of the device. In some embodiments, the electronic processor 210 also sends a notification requesting an override action to the portable communications device via the transceiver (at block 412). The notification alerts the user that the ad hoc talkgroup has been muted and indicates that the device will be automatically dropped from the talkgroup unless an override action is taken by the user to prevent the auto drop. In some embodiments, the call controller 102 does not send the audio mute command to the portable communications device.

The notification could be an audio alert, a visual alert, a haptic alert, or another suitable alert presented to the user, for example, using the input/output interface of the portable communications device. In some embodiments, the notification is a spoken alert generated by a virtual partner, for example, "You have left the geofence for talkgroup 1234. Press the "home" key to stay in the talkgroup." In this example, the override action is a request for a specific keypress. In other examples, the override action may be a push-to-talk input (for example, a press on the push-to-talk button), a voice input (for example, a request to speak a specific word or words to remain in the talkgroup), a sequence of keypresses, or another suitable user input. The call controller 102 begins a standby period (represented by the stopwatch icons in FIG. 6), during which the portable communications device remains in the ad hoc talkgroup prior to being dropped.

In some embodiments, the duration of the standby period is pre-determined (for example, five minutes). In some embodiments, the electronic processor 210 determines a cognitive load for a user of the portable communications device and determines a duration for the standby period based on the user's cognitive load. Cognitive load provides an indication of a user's ability to receive and respond to a query or stimulus based on the activities in which the user is currently engaged. For example, a user who is driving a vehicle may be less able to respond to the notification than a user who is stationary. In another example, a user who is on foot and moving quickly (for example, during a police foot pursuit of a suspect) may be less able to respond to the notification than a user who is driving a squad car or sitting in a squad car. In another example, a user who is actively typing in a report-writing application may be less able to respond to the notification than a user who is not so engaged. In some embodiments, the cognitive load is expressed as a numerical value (for example, a decimal number, an integer, or a percentile) that indicates the user's current cognitive load. For example, the higher the value, the higher the user's cognitive load.

In some embodiments, the cognitive load values are pre-assigned to particular activities, and indications that a user is performing the activity (for example, data received by a computer aided dispatch system indicating that a computer in the user's squad is actively being used) are used to assess the user's cognitive load. In some embodiments, the call controller 102 uses machine learning to determine the cognitive load. For example, a machine learning engine may be trained using historical data indicating users' average response times to similar queries and concurrent historical data indicating the users' activity types and levels at the time. A trained machine learning engine may then use current activity data to predict an average response time, and set the duration for the standby period accordingly.

In some embodiments, cognitive load is based on characteristics received from one or more sensors. The sensors may be, for example, one or more biometric sensors (for example, heart beat sensor) included in a personal area network with the user's subscriber unit. Optionally or in addition, non-biometric data may be used to determine the cognitive load of a user. For example, environmental and situational information may be collected from various devices of the system 100 including other devices connected to the system, for example, internet-of-things (TOT) devices, closed circuit television (CCTV), and body worn cameras (BWC). For example, the subscriber unit 106 may be configured to perform voice analytics and/or video analytics on the audio and visual information received by the subscriber unit to determine a cognitive load. In some embodiments, the status of the weapon status sensor may be evaluated to determine if a weapon has been pulled out or if the user's hand is resting on the weapon, which may indicate a heavier cognitive load.

When an override action indication is received from the portable communications device during the standby period (at block 414), the electronic processor 210, at block 416, sends an audio unmute command based on the talkgroup identifier to the portable communications device (for example, via the transceiver 230), so that the portable communication device will resume broadcast communication of audio received from the talkgroup (for example, via a loudspeaker). When the portable communications device receives the command, it resumes playing audio for the ad hoc talkgroup. In some embodiments, the call controller 102 sends a confirmation message that the device will remain in the ad hoc talkgroup, using for example, a virtual partner.

When an override action indication is not received from the portable communications device during the standby period (at block 414), the electronic processor 210, at block 418, sends a drop command based on the talkgroup identifier to the portable communications device (for example, via the transceiver 230 (at block 418), so that the portable communications device will no longer be in the talkgroup. The drop command causes the portable communications device to remove the ad hoc talkgroup identifier from its memory and to leave the ad hoc talkgroup.

In some embodiments, when portable communications device repeatedly fails to meet the formation criterion, but the user repeatedly overrides, the formation criterion for that portable communications device is adjusted such that it is easier to meet the criterion remains in the ad hoc talkgroup for the talkgroup's lifetime, or until the user manually drops from the talkgroup (for example, enlarging the geofence 504 or changing to higher value of ETA criterion for that portable communications device that repeatedly performs the overrides).

Figure 7:
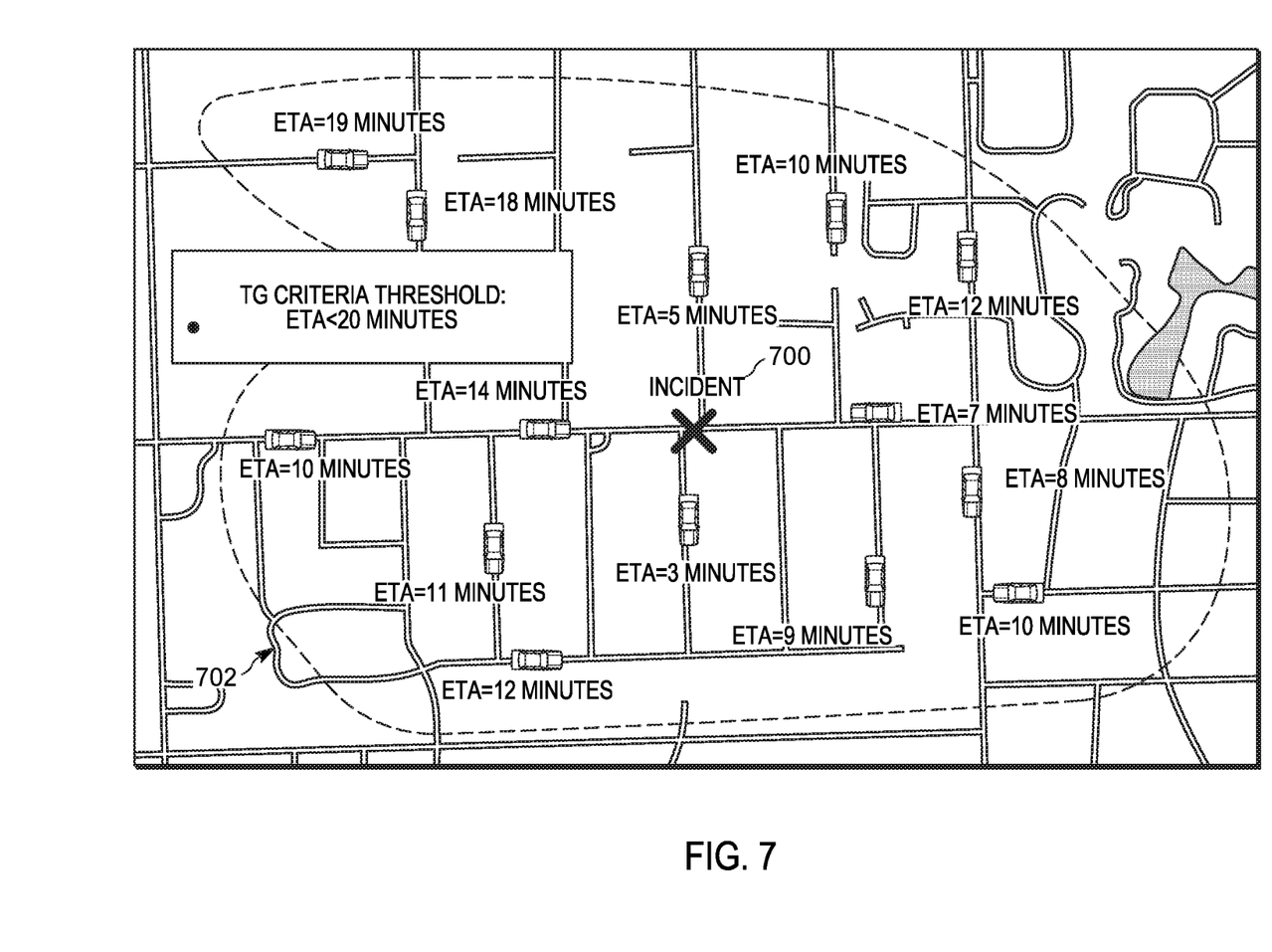
FIG. 7 is a diagram illustrating the formation of an ad hoc talkgroup using the communications system of FIG. 1 in accordance with some embodiments.

In some embodiments, the call controller 102 mitigates auto dropping automatically based on other talkgroup members' actions. For example, in some embodiments, the electronic processor 210 determines a cause for the contextual condition updates for the talkgroup member when the contextual condition update for the talkgroup member no longer meet the talkgroup formation criterion and the talkgroup member has overridden its auto-drop. For example, as illustrated in FIG. 7, an ad hoc talkgroup may be formed based on a talkgroup formation criterion of an estimated time of arrival to an incident 700 being less than twenty minutes. A group of portable communications devices 702 meets the talkgroup formation criterion, and become members of the ad hoc talkgroup.

Figure 8:
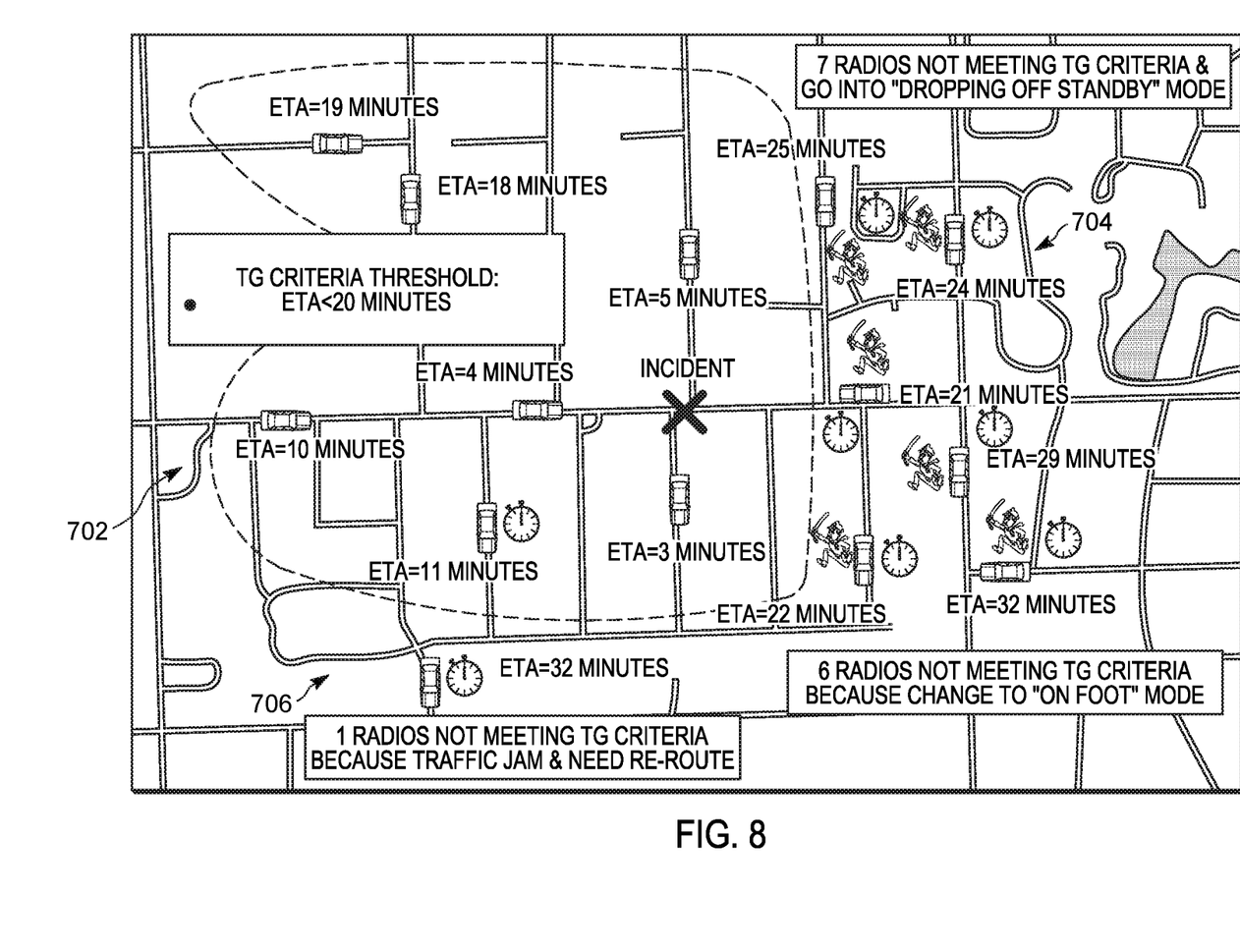
FIG. 8 is a diagram illustrating the operation of the method of FIG. 4 with the ad hoc talkgroup of FIG. 7 in accordance with some embodiments.

In FIG. 8, a quantity of talkgroup members 704 no longer meet the talkgroup formation criteria because their estimated times of arrival have increased above the twenty-minute threshold. They are in the standby period, as indicated by the stopwatch icons. Talkgroup member 706 is also in standby mode because its estimated time of arrival has increased above the twenty-minute threshold.

The electronic processor 210 determines causes for the contextual condition updates. For example, the call controller 102 receives indications from the quantity of talkgroup members 704 that they are now on foot. For example, a squad car system may report to the call controller that a portable communication device is no longer wirelessly linked to the squad car. In another example, a squad car system may report to the call controller that sensors indicate the driver has left the vehicle. In another example, biometric sensors, motion sensors, or other sensors may indicate that the user of the portable communication device is walking or running. With regard to the talkgroup member 706, the call controller may determine that the squad car is in slow moving traffic, for example, by analyzing traffic data received from an outside source. In another example, the user may self-report to a virtual partner or dispatcher that they are in heavy traffic.

In some embodiments, when the contextual condition update for the talkgroup member does not meet the talkgroup formation criterion (as described above with respect to block 408), the electronic processor 210 auto overrides the auto drop decision based on the cause of the contextual condition update and the actions taken by other talkgroup members. In such embodiments, the electronic processor 210 determine whether a quantity of talkgroup members that have overridden their auto drops, and have the same cause for the contextual condition update as the portable communication device, exceed a threshold. The threshold may be absolute (a certain number of talkgroup members) or relative (for example, a percentage or ratio). For example, as illustrated in FIG. 8, six talkgroup members are in standby mode because they are "on foot" (for example, exiting a squad vehicle to pursue a suspect). If four of those talkgroup members override and the threshold is set to 50%, then the electronic processor 210 sends an audio unmute command based on the talkgroup identifier to the portable communications device in response to its no longer meeting the talkgroup formation criterion due to the same reason (for example, the cause of the contextual condition of being "on foot"). Hence, the remaining two talkgroup members will be automatically overridden because the manual override talkgroup members exceed threshold. However, the auto-drop for the talkgroup member 706 would not be automatically overridden because its cause (heavy traffic) is not the same as the cause (being on foot) of the other talkgroup members 704 who have overridden.

In another example, four talkgroup members in a vehicle that are in an ad hoc talkgroup due to being assigned to the same incident and all four ad hoc talkgroup members enter standby mode due to all four of them are reassigned to another incident. Three of the ad hoc talkgroup members (for example, three passengers) perform the override action while one member (for example, the driver) does not perform the override action (for example, due to being busy driving). In this example, the electronic processor 210 will send an audio unmute command to device of the talkgroup member who is driving also, as the percentage (75%) of talkgroup members who has performed the override (among those who enter the standby due to being assigned to another incident) has exceeded a threshold (in this example threshold is set at 60%).

In some embodiments, the call controller 102 is configured to use information about the overrides to adjust how the ad hoc talkgroup is formed or maintained. In such embodiments, the electronic processor 210 adjusts the talkgroup formation criterion when a quantity of talkgroup members having the same cause for the contextual condition update exceeds a threshold. Considering, for example, FIG. 8, when more than 50% of talkgroup members override, the electronic processor 210 may increase the estimated time of arrival threshold (for example, to thirty minutes) to prevent those talkgroup members from being auto-dropped again, and to prevent other talkgroup members from being auto-dropped. Such embodiments further improve the efficiency of the communications system by preventing excessive auto-drop/override cycles.

In some embodiments, the call controller 102 is configured to use information about the overrides along with additional information about the users who override to adjust how the ad hoc talkgroup is formed or maintained. In one example, talkgroup members may be assigned a role or roles (for example, police officer, firefighter, paramedics, and the like). In such embodiments, the electronic processor 210 adjusts the talkgroup formation criterion when a quantity of the talkgroup members, for which an override indication is received and the role identifiers are identical, exceeds a threshold. For example, a number of police and paramedics may respond to an incident. As the incident is being responded to, some personnel may no longer meet the talkgroup formation criteria. As the portable communications devices for such personnel are chosen for auto-dropping, some personnel may override, as described above. Rather than adjusting the talkgroup formation criterion based on only the quantity of received override actions, the electronic processor 210 identifies roles for the personnel who override (for example, by retrieving such information from a computer aided dispatch system). In one example, the threshold for adjusting the talkgroup criterion is set to 60%. When more than 60% of paramedics override, the electronic processor 210 adjusts the talkgroup formation criterion for paramedics to prevent more paramedics from being auto-dropped.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A call controller comprising:
a transceiver;
an electronic processor configured to:
  determine whether a contextual condition for a portable communications device meets a talkgroup formation criterion associated with an ad hoc talkgroup;
  in response to determining that the contextual condition meets the talkgroup formation criterion, send a talkgroup identifier identifying the ad hoc talkgroup to the portable communications device via the transceiver;
  receive a contextual condition update for the portable communications device;
  determine whether the contextual condition update meets the talkgroup formation criterion; and
  in response to determining that the contextual condition update does not meet the talkgroup formation criterion,
    send an audio mute command based on the talkgroup identifier to the portable communications device via the transceiver;
    send a notification requesting an override action to the portable communications device via the transceiver;
  when an override action indication is received from the portable communications device during a standby period, send an audio unmute command based on the talkgroup identifier to the portable communications device via the transceiver; and
  when an override action indication is not received from the portable communications device during the standby period, send a drop command based on the talkgroup identifier to the portable communications device via the transceiver.

2. The call controller of claim 1,
wherein the ad hoc talkgroup includes a plurality of talkgroup members, and
wherein the electronic processor is configured to adjust the talkgroup formation criterion when a quantity of the talkgroup members, for which an override indication is received, exceeds a threshold.

3. The call controller of claim 1, wherein the electronic processor is configured to, when a quantity of override action indications received from the portable communications device exceeds a threshold, adjust the talkgroup formation criterion for the portable communications device such that any value for the contextual condition update for the portable communications device meets the talkgroup formation criterion for a lifetime of the ad hoc talkgroup.

4. The call controller of claim 1, wherein the electronic processor is further configured to
  determine a cognitive load for a user of the portable communications device; and
  determine a duration for the standby period based on the cognitive load.

5. The call controller of claim 1,
wherein the ad hoc talkgroup includes a plurality of talkgroup members, and
wherein the electronic processor is further configured to, for each of the plurality of talkgroup members, determine a cause for the contextual condition update when the contextual condition update for the talkgroup member does not meet the talkgroup formation criterion and an override action indication is received for the talkgroup member.

6. The call controller of claim 5, wherein the electronic processor is configured to send an audio unmute command based on the talkgroup identifier to the portable communications device in response to
  determining that the contextual condition update for the portable communications device does not meet the talkgroup formation criterion, and
  determining that a quantity of talkgroup members having the same cause for the contextual condition update exceeds a threshold.

7. The call controller of claim 5, wherein the electronic processor is configured to adjust the talkgroup formation criterion when a quantity of talkgroup members having the same cause for the contextual condition update exceeds a threshold.

8. The call controller of claim 1,
wherein the ad hoc talkgroup includes a plurality of talkgroup members, each of the plurality of talkgroup members having a role identifier, and
wherein the electronic processor is further configured to adjust the talkgroup formation criterion when a quantity of the talkgroup members, for which an override indication is received and the role identifiers are identical, exceeds a threshold.

9. The call controller of claim 1, wherein the talkgroup formation criterion is one selected from the group consisting of a geofence, an incident type, an incident severity, a travel time, a transport mode, a characteristic of a user of the portable communications device, a response role, an observed object, and a resource type associated with the portable communications device.

10. The call controller of claim 1, wherein the notification is one selected from the group consisting of an audio alert, a visual alert, and a haptic alert.

11. The call controller of claim 1, wherein the override action is one selected from the group consisting of a push-to-talk input, a keypress, and a voice input.

12. A method for operating a communications network, the method comprising:

determining, with an electronic processor, whether a contextual condition for a portable communications device meets a talkgroup formation criterion associated with an ad hoc talkgroup;

in response to determining that the contextual condition meets the talkgroup formation criterion, sending a talkgroup identifier identifying the ad hoc talkgroup to the portable communications device via a transceiver;

receiving a contextual condition update for the portable communications device;

determining, with the electronic processor, whether the contextual condition update meets the talkgroup formation criterion; and in response to determining that the contextual condition update does not meet the talkgroup formation criterion, sending an audio mute command based on the talkgroup identifier to the portable communications device via the transceiver;

sending a notification requesting an override action to the portable communications device via the transceiver; and when an override action indication is received from the portable communications device during a standby period, sending an audio unmute command based on the talkgroup identifier to the portable communications device via the transceiver.

13. The method of claim 12, further comprising:

when an override action indication is not received from the portable communications device during the standby period, sending a drop command based on the talkgroup identifier to the portable communications device via the transceiver.

14. The method of claim 12, adjusting the talkgroup formation criterion when a quantity of the talkgroup members of the ad hoc talkgroup, for which an override indication is received, exceeds a threshold.

15. The method of claim 12, further comprising:

when a quantity of override action indications received from the portable communications device exceeds a threshold, adjusting the talkgroup formation criterion for the portable communications device such that any value for the contextual condition update for the portable communications device meets the talkgroup formation criterion for a lifetime of the ad hoc talkgroup.

16. The method of claim 12, further comprising:

determining a cognitive load for a user of the portable communications device; and determining a duration for the standby period based on the cognitive load.

17. The method of claim 12, further comprising:

for each of a plurality of talkgroup members of the ad hoc talkgroup, determining a cause for the contextual condition update when the contextual condition update for the talkgroup member does not meet the talkgroup formation criterion and an override action indication is received for the talkgroup member; and adjusting the talkgroup formation criterion when a quantity of talkgroup members having the same cause for the contextual condition update exceeds a threshold.

18. The method of claim 17, further comprising:

sending an audio unmute command based on the talkgroup identifier to the portable communications device in response to determining that a quantity of talkgroup members having the same cause for the contextual condition update exceeds a threshold; and determining that the contextual condition update for the portable communications device does not meet the talkgroup formation criterion.

19. The method of claim 12, updating the talkgroup formation criterion when a quantity of talkgroup members of the ad hoc talkgroup, for which an override indication is received and which have identical role identifiers, exceeds a threshold.

20. The method of claim 12, wherein determining whether a contextual condition for a portable communications device meets a talkgroup formation criterion includes determining whether the contextual condition for the portable communications device meets one selected from the group consisting of a geofence, an incident type, an incident severity, a travel time, a transport mode, a characteristic of a user of the portable communications device, a response role, an observed object, and a resource type associated with the portable communications device.

* * * * *